United States Patent [19]
Cryder et al.

[11] 3,771,310
[45] Nov. 13, 1973

[54] HYDROSTATIC DRIVE CONTROL SYSTEM

[75] Inventors: John R. Cryder; Rodney R. Erickson; Kenneth R. Lohbauer; James E. Scheidt, all of Joliet, Ill.

[73] Assignee: Caterpillar Tractor Co., Peoria, Ill.

[22] Filed: Jan. 31, 1972

[21] Appl. No.: 222,041

[52] U.S. Cl............ 60/19, 180/6.48, 60/421, 60/427, 60/465, 60/490
[51] Int. Cl............................. B62d 11/02
[58] Field of Search............ 60/19, 53 R, 53 A, 60/19, 421, 427, 465, 490; 180/6.48, 66

[56] References Cited
UNITED STATES PATENTS
3,381,472  5/1968  Brown et al. ................ 60/53 A
3,477,225  11/1969  Cryder et al. ................. 60/19
3,672,161  6/1972  Krusche et al. ............ 180/6.48 X Primary Examiner—Edgar W. Geoghegan
Attorney—Freling E. Baker et al.

[57] ABSTRACT

A vehicle incorporating a pair of hydostatic transmissions in the drive train is provided with a control system that automatically proportions engine horsepower between vehicle drive and vehicle implements. The control system is responsive to engine speed which is proportional to engine load to control transmission output.

8 Claims, 3 Drawing Figures

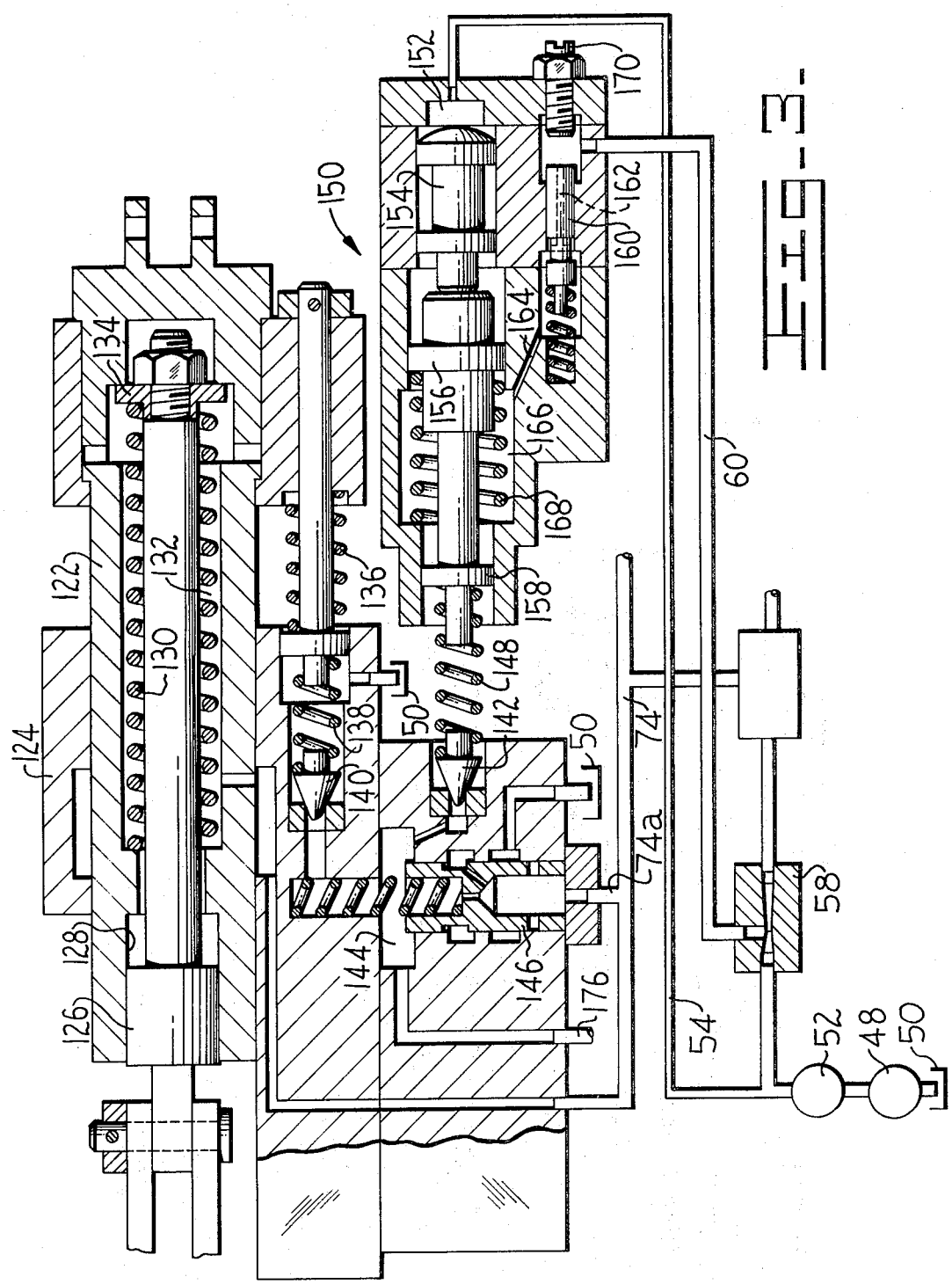

HYDROSTATIC DRIVE CONTROL SYSTEM

BACKGROUND OF THE INVENTION

The present invention relates to hydrostatic transmission and pertains more particularly to control means that are operative to proportion transmission output to the input available.

Reference is made to U.S. Pat. No. 3,381,472 issued May 7, 1968 to Brown et al. and No. 3,477,225 issued Nov. 11, 1969 to Cryder et al., for background into hydrostatic transmission and development history as well as other approaches to solving problems associated therewith.

Numerous others have proposed systems for controlling hydrostatic transmissions; however, few have been directed to the unique problems of coordinated control of a pair of hydrostatic transmissions operatively connected for driving a pair of transversely spaced ground engaging means for vehicle propulsion. Such an arrangement would be provided, for example, in a track drive vehicle wherein each track is separately driven.

The above described arrangement presents a special problem in track drive vehicles wherein the separately driven tracks must be driven at the same speed in order to maintain straight line motion in either forward or reverse direction. The problem of straight line motion is also acute when non-symmetrical loading is imposed on the vehicle as when dozing the side of a hill or loading one side of a scoop or shovel.

Vehicles having other variable load implements can also present a problem of properly proportioning the various loads to the power output of the vehicle engine.

SUMMARY OF THE INVENTION

It is a primary object of the present invention to provide an automatic control system for providing optimum utilization of engine horsepower.

Another object of the present invention is to provide a control system for an infinitely variable transmission system that is operative to properly proportion engine output between vehicle drive and implement control.

A further object of the present invention is to provide a control system for controlling hydrostatically driven track vehicles for continuously powered controlled radius turns.

In accordance with a primary aspect of the present invention, a vehicle utilizing a pair of hydrostatic transmissions is provided with a control system that automatically proportions engine horsepower between vehicle drive and vehicle implements. The control system is responsive to engine speed which is proportional to engine load to control transmission output.

BRIEF DESCRIPTION OF THE DRAWINGS

The above and other objects and advantages of the present invention will become apparent from the following description when read in conjunction with the accompanying drawings wherein.

DETAILED DESCRIPTION OF PREFERRED EMBODIMENTS

Figure 1:
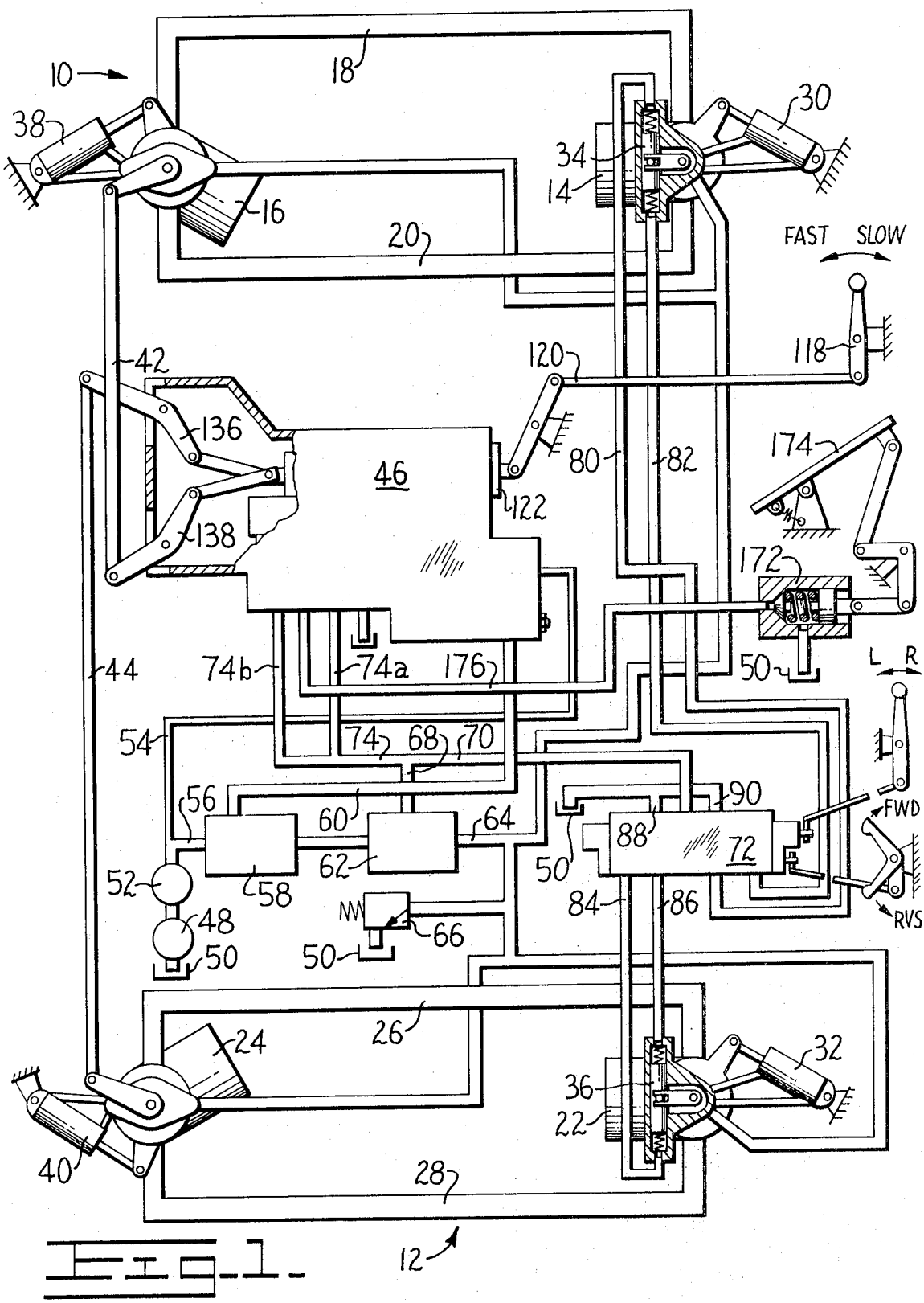
FIG. 1 is a diagrammatic illustration of a control system in accordance with the present invention.

Referring now to the drawings, and with particular reference to FIG. 1, there is illustrated a hydrostatic drive system employing a control system in accordance with the present invention. The illustrated embodiment comprises a pair of hydrostatic transmissions 10 and 12, each of which is operatively connected to be driven by the same engine (not shown) and are operatively connected to transmit torque to separate drive wheels or tracks for translation of the vehicle. The hydrostatic transmission 10 comprises a variable displacement pump 14 and a variable displacement motor 16 operatively connected together by means of a hydraulic loop comprising a conduit 18 and a conduit 20. The hydrostatic transmission 12 is similarly constructed and comprises a variable displacement pump 22 connected to a variable displacement motor 24 by means of conduits 26 and 28.

The displacement of the pumps is varied by hydraulic jacks of linear motors 30 and 32 which are operative to swing the pumps from zero displacement to maximum displacement to either side of center to provide forward and reverse as well as a certain degree of speed control. The swivel motors 30 and 32 are controlled by servo valves (not shown) with the servo valves being actuated by servo actuators 34 and 36 which are responsive to the control system, as will be described later.

The displacement of the motors 16 and 24 is controlled by swivel motors such as hydraulic jacks or linear motors 38 and 40 which are operative to vary the displacement of the motors and thereby vary the speed and/or torque output thereof. The swivel motors are controlled by servo valves (not shown) but which are interconnectd through the control system and by means of links 42 and 44. The servo valve for controlling the displacement of the motors 16 and 24 are interconnected through a speed control valve group 46, to be described later, which in turn is responsive to engine output as well as a speed control selector.

Hydraulic fluid for operation of the control system is supplied by a fixed displacement pump 48 directly driven from the vehicle engine, drawing fluid from a sump 50 and supplying it through a conduit system, including a filter 52, to the various control valves of the system.

A branch conduit 54 communicates pressure from the pump 48 to one side of the underspeed portion of the speed control valve group 46. The main conduit 56 carries the main flow of fluid from the pump 48 to a venturi 58. The low pressure side of the venturi is communicated by conduit 60 to another portion of the underspeed portion of the speed control valve 46. The main flow of fluid through venturi 58 is supplied to a flow control valve 62 where the flow is then divided and distributed by numerous conduits to various portions of the control system.

The flow control valve 62 is operative to divide the flow of fluid and direct a portion of it along conduit 64 where it is supplied to the linear actuator circuit of each of the pumps and motors. The fluid pressure in this circuit is communicated to the servo valves which in turn are operative to direct the fluid to the respective linear actuators for altering the displacement of the pumps and motors.

The control fluid is directed along from flow control valve 62 by way of a conduit 68 which divides into branches 70 to communicate with the forward, reverse and turning valve combination 72 and a branch 74, which again divides into branches 74a and 74b to communicate with the speed control valve group 46.

The pressure of the fluid supplied along conduit 70 will determine the setting of the displacement of the pumps 14 and 22 when the fluid is introduced by the control system and valve 72 and the pilot valves to the displacement actuators.

Figure 2:
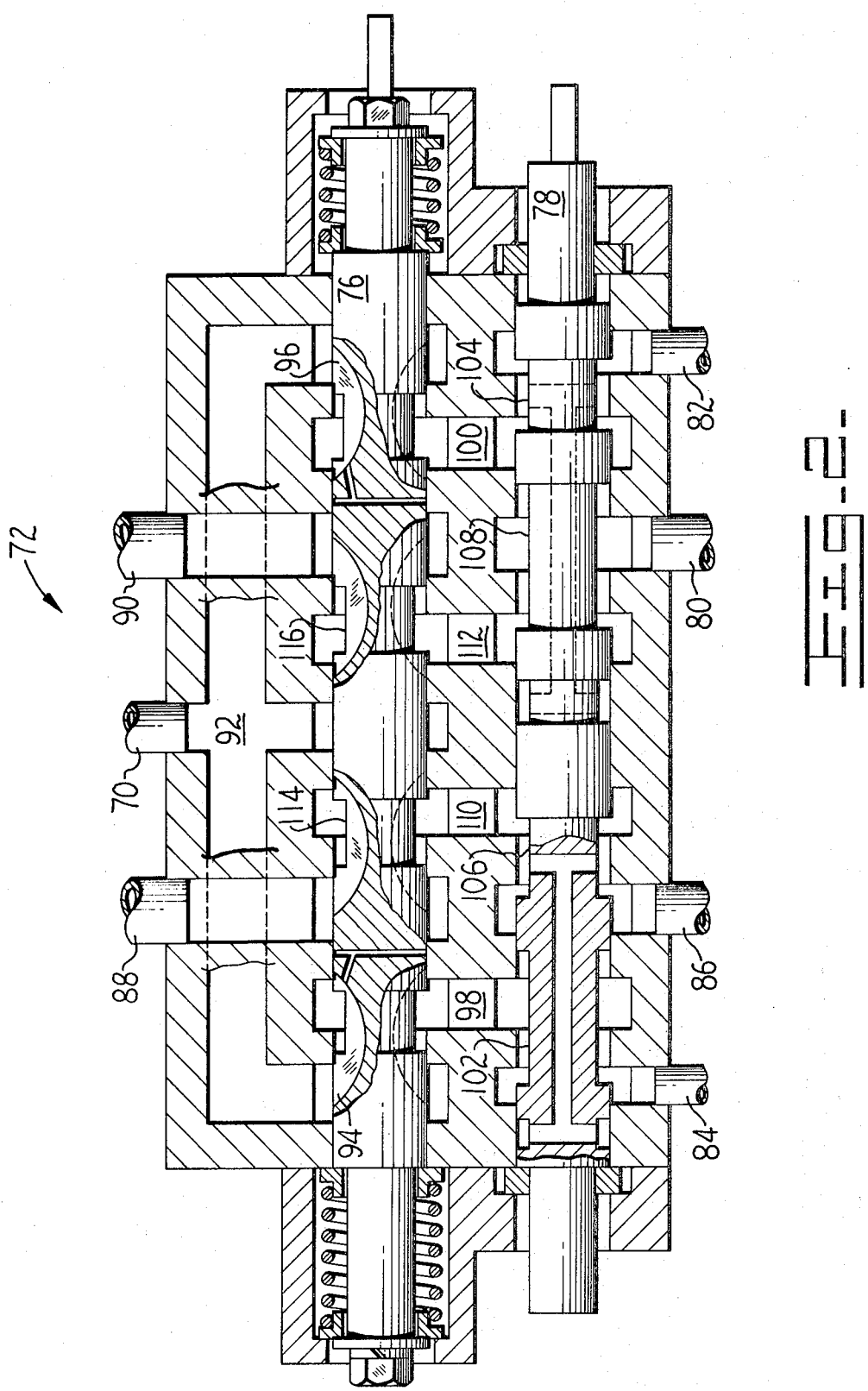
FIG. 2 illustrates a steering and reversing valve group for the system of FIG. 1; and, FIG. 3 illustrates a speed control valve group for the system of FIG. 1.

The valve system 72, as shown in FIG. 2, comprises a steering valve 76 and a directional control valve 78. Fluid introduced into valves 72 may be directed along conduits 80 and 82 to servo actuator 34 of pump 14 and along conduits 84 and 86 to servo actuator 36 of pump 22. Conduits 88 and 90 communicate with the sump 50. With the valve 76 in neutral position, identical pressures will be communicated to displacement controls of the pumps so that the pumps will both be displaced an identical amount. With the valve 76 in neutral position as illustrated, fluid entering inlet passage 70 will flow along branch passage 92 to each end of the spool and across the spool at grooves 94 and 96 and communicate by way of passageways 98 and 100 with the spool 78. With the spool 78 in the activated position for either forward or reverse, fluid from passages 98 and 100 will communicate across grooves 102 and 104 with conduits 82 and 84 for activating the servo valves for the pumps 14 and 22. The degree of displacement of the pumps will depend on the pressure communicated thereto by the conduits 80, 82, 84 and 86 for actuation of the servo valves, and on the actuating pressure 64 which is utilized to pressure the displacement actuators or motors 30 and 32. This pressure in this control system will depend on factors to be described with respect to the speed control valve group 46.

In the illustrated position for valves 76 and 78, the conduits 80 and 86 communicate by way of grooves 106 and 108 on valve 78 with passages 110 and 112, which then communicate by way of grooves 114 and 116 with exhaust lines 88 and 90. As can be readily seen, a shifting of valve 78 to the opposite extreme position will provide communication between the pressure inlet line 70 and the servo control lines 80 and 86 while at the same time providing communication between the other servo control lines 82 and 84 and tank return lines 88 and 90. This shifting of the valve 78 would result in displacement of the pumps 14 and 22 over center in the opposite direction and result in a reversal of the direction of the transmission output.

The steering valve 76 cooperates with the passages in the valve body 72 to form a bridge circuit between the above described servo control lines and the inlet and outlet lines, resulting in an unequal signal being transmitted to the servo control valves of the two pumps. This results in an unequal displacement of the pumps, and consequently, a difference in the drive output of the two transmissions and consequently, a turning of the vehicle in whose drive train the two drive transmissions are coupled.

SPEED CONTROL VALVE MECHANISM

The speed control valve group, indicated generally at 46 and detailed in FIG. 3, is operative in response to the setting of the speed control lever and engine R.P.M. to control the signal and actuating pressures transmitted to the displacement control actuators for the pumps and motors of the pair of hydrostatic transmissions. A speed control lever 118 is operatively connected in a suitable manner such as a linkage 120 to a cylinder housing 122, which in turn is reciprocally mounted in a housing 124. A piston 126 is mounted within the cylindrical bore 128 of the housing 122 and is retracted, or biased to a retracted position, by means of a spring 130 mounted within chamber 132 and engaging the end wall of the housing and collar 134 of the piston rod. The piston 126 is operatively connected by suitable linkage system comprising a pair of levers 138 136 and links 42 and 44, to the servo control valves of the motors 38 and 40. Movement of the control lever 118 in either direction, moves the housing 122 and establishes a position for the servo control valves of motors 38 and 40, as determined by the position of the piston 126. Movement of the housing 122 alters the force of springs 136 and 138, which in turn alters the force seating poppet or check valve 140. The force which acts to seat valve 140 and a poppet or check valve 142 determines the top pressure in chamber 144 and consequently, the top pressure available for operating the pump servo actuators 34 and 36 and the motor servo piston 126.

The chamber 144 is in communication by way of conduit 74a, which communicates with conduit 74, providing the aforementioned actuating pressure. A relief valve dump spool 146 is interposed between the inlet from conduit 74 and the chamber 144.

The force acting to seat valve 142 is developed in venturi 58 and transmitted through a spring 148 by means of a differential piston system. The venturi 58 creates a differential pressure between conduits 54 and 60, which differential pressure is communicated to a differential piston system 150 which is operative to apply a force to seat check valve 142, which force is proportional to the differential pressure established. The differential pressure established or developed in venturi 58 is directly proportional to engine speed, in this arrangement since pump 48 is fixed displacement and is directly driven from the vehicle engine.

Pressure established in line 54 will communicate with the chamber 152 where it acts on a piston 154 which in turn transmits a force against a piston assembly comprising a large piston 156 interconnected with a smaller piston 158 and abutting against spring 148. Pressure developed in conduit 60 is transmitted or communicated through an adjustable check valve 160 where it communicates by way of a passage 162 in the check valve body with a passage 164 to communicate with chamber 166. Pressure in chamber 166 acts together with spring 168 on the large piston 156 against the pressure in chamber 152. A screw 170 is provided for adjusting the closed position of valve 160.

The greater the volume of fluid flowing through venturi 58, the greater will be the differential pressure in conduits 54 and 60, with a greater pressure being applied in chamber 152, thus increasing the pressure applied through spring 148 to the check valve 142, increasing the pressure that has to be developed in chamber 144 to open the valves with a resulting greater increase in the pressure in the displacement control circuit.

A dump valve 172, operated by a speed override foot pedal 174, provides hydrostatic braking for the system by dumping the fluid from chamber 144 by way of conduit 176 to tank 50. The dropping of the pressure results in the pumps 14 and 22 automatically slewing back to zero position without changing the setting of the lever 118.

We claim:

1. A control system for a hydrostatic drive system for an engine driven vehicle having independently drive translation elements, driven from said engine by a pair of infinitely variable hydrostatic transmissions, said control system comprising:
   hydraulic control means interconnected for coordinated control of said transmissions;
   a source of control pressure comprising a fixed displacement pump directly driven by said vehicle engine;
   means responsive to the pressure of said control fluid to control the ratio of said transmissions;
   means for establishing said control pressure for a given engine speed; and
   said pressure establishing means including differential pressure generating means including a venturi through which a portion of said control fluid is directed.

2. The invention of claim 1 comprising a first relief valve having a pressure setting that is proportional to said differential pressure.

3. The invention of claim 2 comprising a second relief valve and means to establish the pressure of said valve.

4. The invention of claim 3 wherein each of said hydrostatic transmissions comprises a variable displacement pump and a variable displacement motor driven by fluid from said variable displacement pump.

5. The invention of claim 4 comprising linkage means interconnecting said motor to establish position correspondence thereof;
   hydraulic means interconnecting said pumps to establish position correspondence thereof; and
   means to alter the position correspondence of said pumps to thereby alter the output of one of said transmissions with respect to the other.

6. The invention of claim 5 comprising a piston operatively connected for controlling the displacement of said motor;
   means communicating said control fluid to operate said piston; and
   control means for moving said piston independently of said control fluid.

7. The invention of claim 6 comprising a movable housing having a cylindrical bore in which said piston is mounted;
   spring means mounted in said housing to bias said piston against the pressure of said control fluid;
   a lever operatively connected to move said housing to position said piston; and
   means operatively connecting said lever for adjusting the seating of said second relief valve.

8. A dual transmission drive system for a vehicle, said system comprising:
   a pair of hydrostatic transmissions, each connected to drive a separate drive means of said vehicle from a common engine;
   speed responsive control means operatively interconnecting said transmissions to automatically adjust said transmission output to the power available from the engine of said vehicle;
   said control means comprises a source of control fluid, including
   a fixed displacement pump;
   means for establishing a differential pressure in said control fluid;
   means responsive to the pressure of said control fluid to adjust the ratio of said transmissions;
   means comprising a pair of relief valves for establishing the peak pressure of said control fluid for a given pump speed;
   one of said valves being responsive to said differential pressure; and
   the other of said valves being responsive to the selected positions of a control lever.

* * * * *